United States Patent
Hodges et al.

(10) Patent No.: US 8,727,349 B2
(45) Date of Patent: May 20, 2014

(54) TICKETS AND SYSTEM FOR LOTTERY GAMES

(75) Inventors: Christopher Joseph Colin Hodges, Fulham Garden (AU); Robert William Holden, Capalaba (AU)

(73) Assignee: Pro-Active Games Pty Ltd. (AU)

( * ) Notice: Subject to any disclaimer, the term of this patent is extended or adjusted under 35 U.S.C. 154(b) by 0 days.

(21) Appl. No.: 13/254,412

(22) PCT Filed: Mar. 5, 2010

(86) PCT No.: PCT/AU2010/000263
§ 371 (c)(1),
(2), (4) Date: Sep. 1, 2011

(87) PCT Pub. No.: WO2010/099582
PCT Pub. Date: Sep. 10, 2010

(65) Prior Publication Data
US 2011/0319150 A1    Dec. 29, 2011

(30) Foreign Application Priority Data
Mar. 6, 2009 (AU) ................................ 2009901107

(51) Int. Cl.
*A63F 3/06* (2006.01)
(52) U.S. Cl.
USPC ......................................... 273/139; 273/269
(58) Field of Classification Search
USPC ........................... 463/4, 16, 42; 273/169, 269
See application file for complete search history.

(56) References Cited

U.S. PATENT DOCUMENTS

| | | |
|---|---|---|
| 5,518,239 A | 5/1996 | Johnston |
| 2003/0212623 A1 | 11/2003 | Aylmer et al. |
| 2005/0192078 A1 | 9/2005 | Jawaharlal |
| 2007/0225059 A1 | 9/2007 | Scrymgeour et al. |
| 2007/0288316 A1 | 12/2007 | Burns et al. |
| 2008/0194307 A1* | 8/2008 | Sanger ............................. 463/4 |
| 2008/0248849 A1* | 10/2008 | Lutnick et al. .................. 463/16 |
| 2008/0287188 A1* | 11/2008 | Riera Jorba et al. ............ 463/29 |
| 2011/0275440 A1* | 11/2011 | Faktor ............................. 463/42 |

FOREIGN PATENT DOCUMENTS

| | | |
|---|---|---|
| WO | 03082415 A1 | 10/2003 |
| WO | 2008011632 A2 | 1/2008 |

OTHER PUBLICATIONS

NSW Lotteries, "Powerball", Retrieved from internet, http://www.nswlotteries.com.au/how-to-play-powerball, dated Nov. 28, 2010.
International Search Report dated Apr. 1, 2010, of counterpart International Application No. PCT/AU2010/000263.

* cited by examiner

*Primary Examiner* — Masud Ahmed
(74) *Attorney, Agent, or Firm* — Pierce Atwood LLP; Steven M. Mills

(57) ABSTRACT

The present invention provides lottery tickets each of which incorporates one or more set(s) of random results data generated by random data generating software. Each set of random results data corresponding to possible results of game play, a sports event or a sporting contest, and incorporates a verification code for each set of random results data.

8 Claims, 8 Drawing Sheets

TICKETS AND SYSTEM FOR LOTTERY GAMES

The present application claims the benefit of priority of International Application No. PCT/AU2010/000263, filed Mar. 5, 2010, which claims priority to Australia Patent Application No. 2009901107, filed Mar. 6, 2009. The entire contents of each of the above documents are incorporated herein by reference.

TECHNICAL FIELD

This invention relates to tickets or cards for lottery games, and in particular to scratch tickets or cards having randomly selected symbols (e.g. characters, numerals and/or graphics) corresponding to a result of a sports event or sporting contest, and also having a verification code (e.g. a pin code or serial number).

BACKGROUND TO THE INVENTION

There are many examples of scratch tickets for use in lotteries, and associated security systems to reduce the risk of fraudulent prize claims.

International (PCT) Patent Specification No. WO 2008011632 entitled "System and method for buying and playing electronic instant scratch off games" provides the following background information regarding the use of scratch-off game tickets in state lotteries in USA: State lottery agencies in USA typically impose complex procedures on instant scratch-off game manufacturers to ensure that scratch-off games function properly. For example, in most states, the state lottery agency determines the odds of winning and the total number of cards to be brought to market. Following this, the lottery agency commissions the printing of instant scratch-off tickets per the predetermined odds. Typically, the instant scratch-off tickets include a unique identifier that the lottery agency can use to determine where a ticket was sold and what, if any, prize is associated with the ticket. Packets of tickets are also assigned unique identifiers and the packets are distributed to the lottery retailers. The retailer, upon receipt of a packet, can activate the packet for sale using a lottery agency kiosk or the like. By employing identifiers at the ticket and packet level, the state lottery commission can readily track the location of each ticket and packet, at least up until the time of sale.

International (PCT) Patent Specification No. WO 2008011632 discloses a system utilising a plurality of electronic records, stored in a database, each representing an electronic instant scratch-off game ticket, the records comprising an identifier and a prize. A lottery transaction processing module is also disclosed which facilitates the purchasing, via a communications network, of at least one of the electronic instant scratch-off game tickets represented by the plurality of electronic records. A lottery client module is disclosed which provides an interface through which the player can purchase at least one of the electronic instant scratch-off game tickets. Still further, a lottery management module is provided which retrieves the prize information associated with the electronic record from the database and provides the information to the lottery transaction processing module. The lottery management module can also authorize the lottery transaction module to deposit winnings into a lottery account associated with a winning player.

International (PCT) Patent Specification No. WO 03082415 entitled "Game piece and system and method of use" discloses various types of games that preferably utilize a game ticket to provide a first game with a base award. A second or other succeeding game may provide the opportunity to multiply the award or otherwise provide additional or different (including possibly reduced or less valuable or desirable) prizes. The game tickets preferably have hidden indicia for at least one of the games played in conjunction with the ticket, and the hidden indicia are preferably determined by scratching off a removable material. In one embodiment, the ticket includes hidden indicia for both a first game and a second game, and the second game includes a group of such indicia from which the player must pick in order to procure a single award multiplier. Portions of the game may be determined in conjunction with other gaming activities, such as publicised multiplier determination games, announcements or draws.

United States Patent Specification No. US 2007225059 entitled "Lottery ticket with extended play" discloses a lottery ticket defining a lottery game which is printed on a substrate which includes a set of game rules, and a series of game elements defined by game symbols covered by material which can be scratched off to expose to the player whether the game data of that game element is a winning game with a points value to be awarded. The game elements and the game rules provide a total points value. A chart is printed in the substrate defining a series of points values each associated with a respective prize value such that the game provides a prize value which is determined by comparing with that chart.

Currently, there are many instant scratch tickets available on the market for a variety of different games. For example, "Three of Kind" tickets have squares with a scratchable coating to be scratched off, and three of those squares must "match" to win the particular prize that is depicted underneath the scratchable coating of the squares. However, these scratch tickets do not allow interaction with a "live" sports event.

SUMMARY OF THE INVENTION

In a first aspect, the present invention provides lottery tickets, each of which incorporates one or more set(s) of random results data generated by random data generating software, each set of random results data corresponding to possible results of gameplay, a sports event or a sporting contest, and also incorporates a verification code for each set of random results data.

In a second aspect, the lottery system of the present invention includes:
(a) a computer processor for processing of parameters and results for gameplay, a sports event or a sporting contest;
(b) random data generating software which generates:
   (i) multiple sets of random results data, corresponding to possible results of gameplay, a sports event or a sporting contest, and
   (ii) a verification code for each set of random results data,
(c) a database for storage of the multiple sets of random results data and verification codes;
(d) a lottery ticket generator for generating lottery tickets, each of which incorporates at least one set of random results data generated by the software together with the verification code for each set of data;
(e) a lottery transaction processing module which communicates with the computer processor, wherein the lottery transaction processing module allows the purchase of lottery ticket(s); and
(f) a lottery management system which communicates with the computer processor, wherein the lottery management system includes:

(i) a first input means for input of the actual results of gameplay, the sports event or the sporting contest, and, (ii) a second input means which allows input of the random results data and verification code from a lottery ticket, wherein the random results data and verification code from the lottery ticket are communicated to the computer processor for comparison and verification with the random results data stored under that verification code in the database and, if the verification code from the lottery ticket is confirmed as being authentic, an appropriate prize is determined, based on a comparison between the set(s) of random results data appearing on the lottery ticket and the actual results of the gameplay, sports event or sporting contest.

The term "results", as used throughout the specification and claims, includes within its scope the final outcome (final score) of a sports event or sporting contest, or results for any stage of a sports event or sporting contest (e.g. an over of a cricket match or an innings of a baseball game).

References throughout the specification and claims to determination of "an appropriate prize" include within their scope the determination that no prize is to be awarded, if the random results data stored on the lottery ticket are sufficiently different from the actual results of the gameplay, sports event or sporting contest.

The random data generating software is, for example, a Random Number Generator (RNG). It should be noted however that the random results data generated by the RNG (or other random data generating software) is not necessarily a combination of numbers or numerals, but may instead consist of or include characters (e.g. letters or words) and/or graphical elements.

In a preferred embodiment, the lottery tickets are scratch tickets (e.g. "Scratch 'n' Match Sports Cards"). Each of the lottery tickets will incorporate a randomly generated combination of characters, numerals and/or graphics that represents possible results of a particular gameplay, sports event or sporting contest, such as a cricket match or baseball game. This allows the tickets to be used for a lottery run in conjunction with "live" sports events or sporting contests, such as cricket matches or baseball games. Winning of prizes in the lottery will directly correlate with the results of gameplay, a sports event or a sporting contest.

If the gameplay, sports event or sporting contest relates to a cricket match, the random results data incorporated on the lottery tickets may include a randomly generated over allocation with randomly generated results for some or all of the balls of that over (preferably, for all six balls of the over).

If the gameplay, sports event or sporting contest relates to a baseball game, the random results data incorporated on the lottery tickets may include a randomly generated innings allocation with randomly generated results for some or all of the outs of that innings (preferably, for six of the outs of the innings).

It is to be understood that the invention is not restricted to cricket or baseball sports events or sporting contests.

DETAILED DESCRIPTION OF VARIOUS EMBODIMENTS OF THE INVENTION

Figure 1:
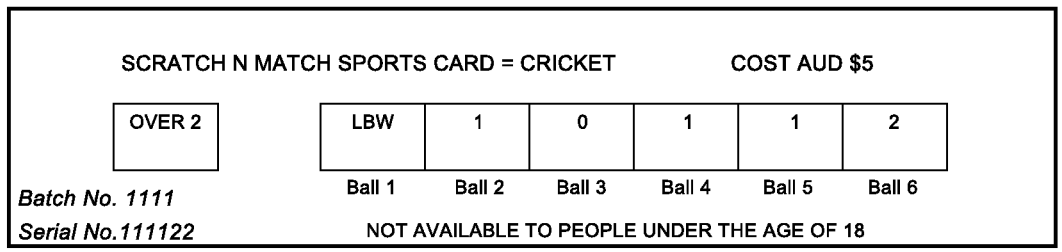
FIG. 1 illustrates the information to be incorporated on a scratch card according to the present invention, issued in relation to a cricket match.

The lottery games will now be described in terms of preferred embodiments, which are illustrative, but not restrictive, of the present invention.

In the following embodiments, and in particular Examples 1 and 2, a Random Number Generator (RNG) is used as the random data generating software to generate data corresponding to the results of gameplay, a sports event or a sporting contest, for printing on lottery tickets. The lottery tickets may be issued to the public at sports arenas, at lottery agencies or directly on-line to customers. The lottery ticket is preferably a scratch ticket so that the random results are not visible upon purchase.

The scratch ticket may, for example, have spaces for printing the number of an over of a cricket match and the results (number of runs, LBW etc.) for each ball of that over. That data is randomly generated by the RNG and printed on the ticket. A verification code, such as a pin code or serial number, is also printed on the ticket, so as to identify the ticket and to allow for later verification that the data printed on that particular ticket is authentic. If the purchaser ascertains in due course that he/she has a winning ticket, the purchaser returns the ticket to an input unit (in one example, this could also be a payout location) where the data and verification code printed on the ticket are preferably machine-read and, if confirmed as being authentic, the appropriate payout or prize is dispensed. Alternatively, the purchaser can manually enter the data and vertification code into the input unit (or at the payout location).

In the following Examples 1 and 2, "Scratch 'n' Match Sports Cards" for use in conjunction with cricket matches and baseball games are described. However, the present invention is not limited to these sports.

Each "Scratch 'n' Match Sports Card" incorporates randomly generated data, being a combination of characters, numerals and/or graphics, printed on spaces (e.g. squares) of the scratch card, the data printed on each of the spaces (squares etc.) representing possible results associated with a particular sports event or sporting contest, such as a cricket match or baseball game. For example, the card may have spaces for printing the number of an over of a cricket match and the results (number of runs, LBW etc.) for each ball of that over. The holder (purchaser) of the "Scratch 'n' Match Sports Card" is required to scratch off the scratchable material covering the spaces (e.g. squares) in order to "match" their randomly generated combination of characters, numerals and/or graphics, representing possible outcomes, to the actual results of that particular gameplay, sports event or sporting contest, such as a cricket match or baseball game.

This adds to the interest of a lottery game, or adds an extra dimension of interest for a person watching a sports event or sporting contest, as the lottery ticket purchaser is able to interact with, for example, a "live" cricket match or baseball game—the winning of a prize in the lottery directly correlates with the results of the sports event or sporting contest.

The lottery organiser will of course be required to obtain any relevant permits for the jurisdiction in which the "Scratch 'n' Match Sports Cards" are being made available to the public.

The Random Number Generator (RNG) should be based or housed on a secure server. The RNG will generate a series of games when requested by the lottery organiser. In order to do so, the RNG will use appropriate algorithms to randomly generate various combinations of characters, numerals and/or graphics that represent possible results of a particular gameplay, sports event or sporting contest, such as a cricket match or baseball game. Each game, to be printed on a lottery ticket, will include one of these randomly generated combinations of characters, numerals and/or graphics.

The lottery organiser will input the number of games required for the sports event or sporting contest (e.g. cricket match or baseball game), which will coincide with the number of expected "Scratch 'n' Match Sports Cards" that is needed for printing for that particular sports event or sporting contest.

The Random Number Generator (RNG) will also assign a verification code, such as a pin code, to each game. These verification codes will be stored on the lottery organiser's mainframe (administration) system and will be used as an accountability/verification measure in determining winners.

Each pin code will be assigned a sequential serial number (using, for example, a binary numbering system), and these serial numbers are to be printed on the front of every "Scratch 'n' Match Sports Card". Having the sequential serial number printed on each and every "Scratch 'n' Match Sports Card" is a means of ensuring that no-one can claim a prize due to a print error or fraud.

Whenever the lottery organiser makes a system request to the Random Number Generator (RNG) for a number of games to be generated to print for a particular sports event or sporting contest (e.g. a cricket match or baseball game), that total number of games will be assigned a batch number (using, for example, a binary numbering system) which will be printed along with the serial number onto the front of each and every "Scratch 'n' Match Sports Card". The batch number will also be stored on the lottery organiser's mainframe (administration) system. Preferably, the stored data for a batch will record the time and date on which that particular batch of games was generated.

The reason for this process is to prevent any fraudulent activity or human or computer error.

Preferably, the randomly generated games will be independently monitored by a third party.

The games are then sent to a generator such as a printer or printers. The printer(s) utilise a printing database incorporating the data from the RNG, together with the corresponding verification codes, to print off the required number of "Scratch 'n' Match Sports Cards" as per the lottery organiser's request.

The printer(s) will print each game on the front of a "Scratch 'n' Match Sports Card". Each game will incorporate a randomly generated combination of characters, numerals and/or graphics printed on the relevant spaces (e.g. squares) of the card, with each space (e.g. square) representing a possible outcome to the relevant gameplay, sports event or sporting contest (such as a cricket match or baseball game). Each space (e.g. square) of the card is covered by scratchable material. Also, the sequential serial number and the batch number will be printed on the front of each and every "Scratch 'n' Match Sports Card".

Preferably, the terms and conditions of entry will be printed on the back of each "Scratch 'n' Match Sports Cards".

The "Scratch 'n' Match Sports Cards" may also incorporate additional information printed on the front or back of the cards, for example: the cost of the card, warnings such as "Not available to people under the age of 18 [or other relevant age]", pictures or descriptions of one or more of the prizes (in particular, the first prize), or advertising or promotional material.

Each "Scratch 'n' Match Sports Card" forms an entry in a lottery or "game of chance", and a purchaser has a chance of winning a prize. Preferably, there will be the chance of winning a major prize (the first prize), as well as minor prizes. The major and minor prizes may be claimed depending on how closely the particular combination of randomly selected symbols (e.g. characters, numerals and/or graphics), representing a possible outcome, and printed in the squares (or other spaces) that the purchaser has scratched, corresponds to the actual outcome of the gameplay, sports event or sporting contest (such as a cricket match or baseball game).

For example, for a "Scratch 'n' Match Sports Card" having six spaces in which randomly generated data (corresponding to, for example, the six balls of an over of a cricket match) is printed, the prize distribution may be as follows:

Matching 6/6, 1st prize is awarded.
Matching 5/6, 2nd prize is awarded.
Matching 4/6, 3rd prize is awarded.
Matching 3/6, 4th prize is awarded.

A prizewinner may, for example, be able to claim their prize via the lottery organiser's website, by entering their contact details (e.g. name, postal address, email address and phone number) and by entering the serial number and batch number that is on their "Scratch 'n' Match Sports Card". Alternatively, claims may be lodged directly at lottery agencies. The lottery organiser's mainframe (administration) system cross references the details entered by the holder or agency with the data stored on the mainframe computer. Once the cross reference is completed, the holder is advised if they indeed have a winning "Scratch 'n' Match Sports Card". The holder may then be required to present the "Scratch 'n' Match Sports Card" to the lottery organiser (possibly, via a lottery agency) to confirm the scratch card's authenticity.

"Scratch 'n' Match Sports Cards" may be marketed on-line or by lottery agencies. Preferably, the venues at which the "Scratch 'n' Match Sports Cards" are made available will include the sports arena/stadium at which the relevant sports event or sporting contest (e.g. cricket match or baseball game) is being played.

Example 1

"Scratch 'n' Match Sports Cards" for Cricket

A Random Number Generator (RNG) based or housed on a secure server, outside the control of the lottery organiser, generates a pre-determined number of games (e.g. 50,000), as requested by the Australian Cricket Board for a T20 cricket match, Australia versus South Africa, to be played at the Melbourne Cricket Ground (MCG) on the 11th of Jan. 2009.

Figure 2:
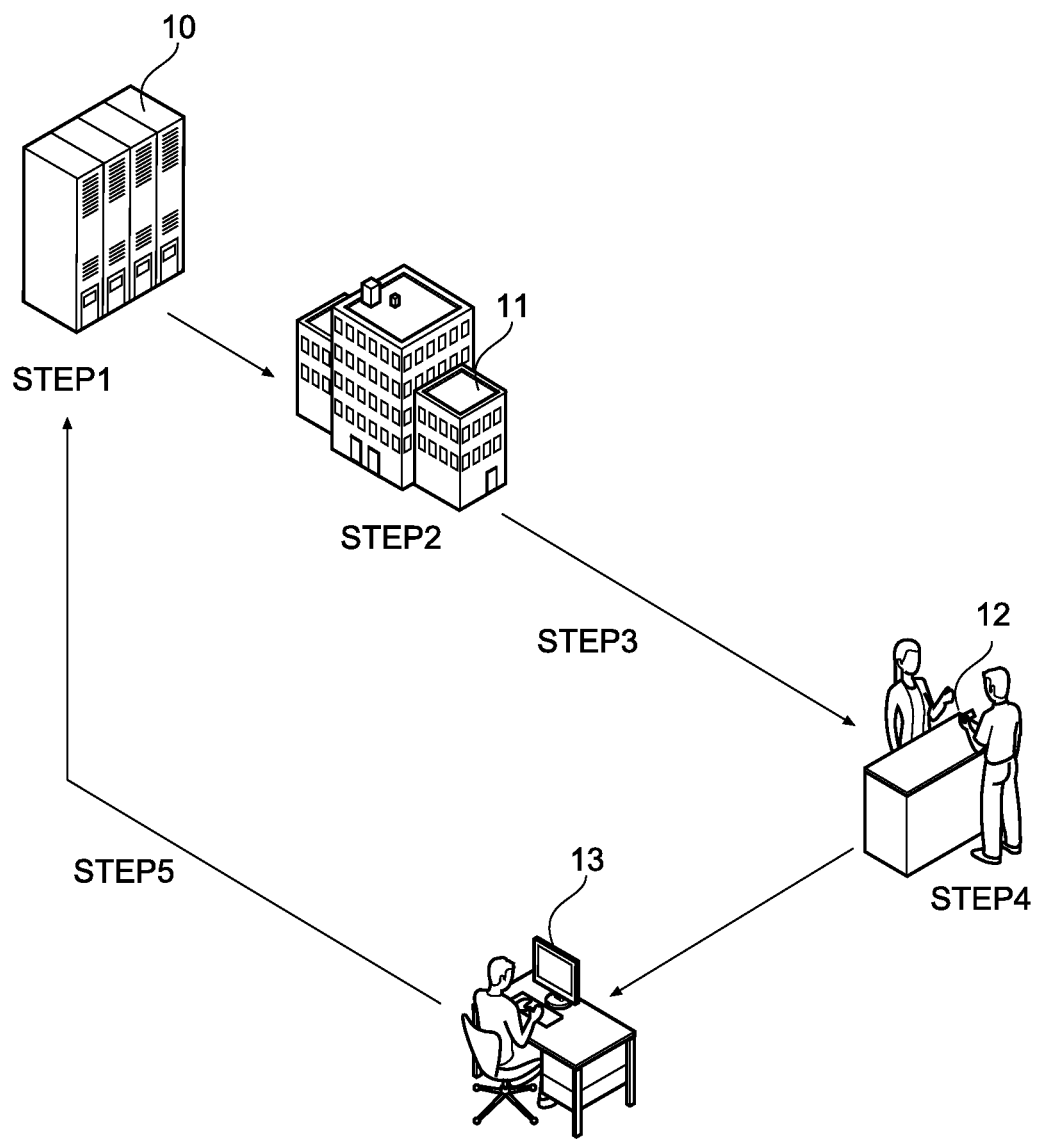
FIG. 2 is a block diagram illustrating the interaction of the various components of the system of the present invention, for scratch cards issued in relation to a cricket match—in this case, a T20 cricket match, Australia versus South Africa, that is to be played at the Melbourne Cricket Ground (MCG) on the 11th of Jan. 2009.

The process is illustrated in FIG. 2. Each game provides a randomly generated Over allocation having a randomly generated six-ball scenario of characters (how wickets fell) and numbers (runs scored) in relation to that T20 cricket match (Australia versus South Africa). In Step 1, the operating system or server 10 of the organisers of the lottery houses a Random Number Generator (RNG) which generates the required number (e.g. 50,000) of games, each of the games corresponding to possible results for the cricket match. Each game has a corresponding pin code allocated to it. The pin code includes a serial number for verification purposes.

In Step 2, a database including the data generated by the RNG is sent to a printer 11 to print off the 50,000 "Scratch 'n' Match Sports Cards", conveniently a week prior to the date on which this cricket match commences. Each of the 50,000 "Scratch 'n' Match Sports Cards" will have a randomly generated Over allocation having a randomly generated six-ball scenario of characters (how wickets fell) and numbers (runs scored) printed on the front of it. Furthermore, each "Scratch 'n' Match Sports Card" will have, on the front of it, a different serial number (but the same batch number) and a fixed price of (for example) $(AUD)5. The printer prints off the required number (in this case, 50,000) of "Scratch 'n' Match Sports Cards" and, in Step 3, the lottery organiser arranges for the shipment of those cards to suitable sales venues, including the MCG, prior to the start of the T20 cricket match, Australia versus South Africa. In Step 4, a "Scratch 'n' Match Sports Card" is purchased at one of these sales venues by a purchaser 12.

In the above example, a "Scratch 'n' Match Sports Card" purchaser 12, after having scratched off the scratchable material covering the squares of their scratch card, may have the results indicated in FIG. 1. (The scratchable material is often grey in colour, although other colours can be used.) The batch number for the batch of "Scratch 'n' Match Sports Cards" produced for that cricket match is 1111, the serial number (verification code) for this particular card is 111122, the randomly generated Over allocation is Over 2, and the randomly generated six-ball scenario is:

Ball 1—LBW
Ball 2—1
Ball 3—0
Ball 4—1
Ball 5—1
Ball 6—2

If the actual six legal deliveries bowled within Over 2 of the T20 cricket match, Australia versus South Africa, played at the MCG on the 11th of Jan. 2009, provide outcomes which "match" the corresponding 6-ball outcome printed on the purchaser's "Scratch 'n' Match Sports Card", then the purchaser is said to have "6/6 Ball Matching", and is directed to go to the lottery organiser's website and enter their personal details, the serial number and batch number for confirmation of a winning "Scratch 'n' Match Sports Card".

In this Example, the terms of the lottery specify that only legal deliveries are to be taken into account, with no-balls and wides being deemed to be illegal deliveries. In each game, there are 14 (fourteen) different outcomes possible for a particular legal delivery bowled in an Over.

The 14 possible outcomes for a legal delivery are:
Numbers Values (Representing the Number of Runs Scored):
 0, 1, 2, 3, 4, 6 (excluding the number value 5)
 =6 possible outcomes Character Values (Representing how the Wicket Fell):
 B=Bowled
 LBW=Leg Before Wicket
 CF=Caught Fielder
 CB=Caught & Bowled
 CW=Caught Wicketkeeper
 AO=Any Other mode of dismissal
 BY=Bye
 LB=Leg Bye
 =8 possible outcomes The Over allocation for the "Scratch 'n' Match Sports Cards" to be issued will be for all 40 (forty) overs of the T20 cricket match; that is, Overs 0 to 20 for the team batting first and Overs 21 to 40 for the team batting second.

For an ODI or a One Day Cricket Match, the Over allocation for the "Scratch 'n' Match Sports Cards" to be issued may, for example, be restricted to a maximum of 40 (forty) Overs out of a possible 100 (one hundred) Overs bowled. For example, the allocated Overs could be selected from the Overs between 20 and 39 for the team batting first and the Overs between 60 and 79 for the team batting second.

In a preferred embodiment, no two "Scratch 'n' Match Sports Cards" generated for the same cricket match will be the same.

In an alternative embodiment, it is possible for the RNG to generate more than one "Scratch 'n' Match Sports Card" including the same data. In that case, if more than one "Scratch 'n' Match Sports Card" is eligible for a particular prize, the amount awarded to the holder of a winning card will be dependent on the total number of cards which are eligible for that prize.

Step 5 relates to claiming a prize. If, after the cricket match has been played, the purchaser 12 believes that he/she may have a winning ticket, the purchaser can (using his/her laptop computer 13 or any other convenient means) enter the required personal details (such as his/her name, address and phone number) and the serial number and batch number of the ticket on the website of the lottery organisers. The ticket details can be entered manually or using a scanner. The mainframe computer system of the lottery organisers will cross-reference the details entered by the purchaser with the data stored on the computer to confirm whether the ticket is authentic. The purchaser may then be required to present his/her ticket to the lottery organisers (or one of their agents) for further verification and to be awarded an appropriate prize.

Alternatively, rather than the purchaser checking his/her ticket to ascertain whether it is a winning ticket, the ticket can be taken to the lottery organisers (or one of their agents) for this check to be carried out and for an appropriate prize (if any) to then be awarded.

FIG. 2 is a block diagram illustrating the interaction of the various components of the system, and providing further information in relation to this Example.

Figure 3:
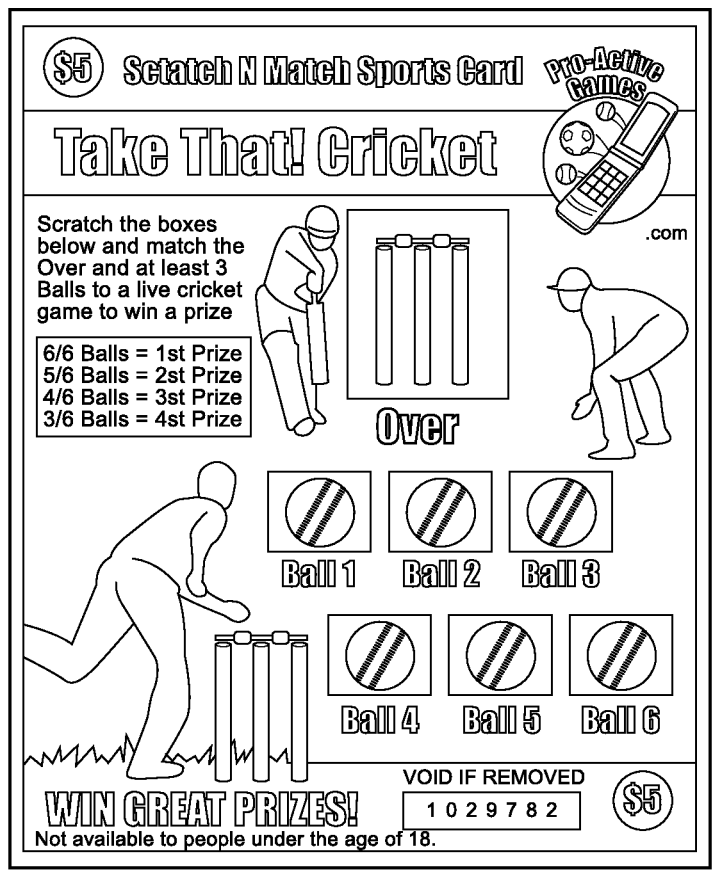
FIG. 3 depicts a scratch card according to the present invention, issued in relation to a cricket match, this scratch card being in "as to be sold" condition (unscratched)
Figure 4:
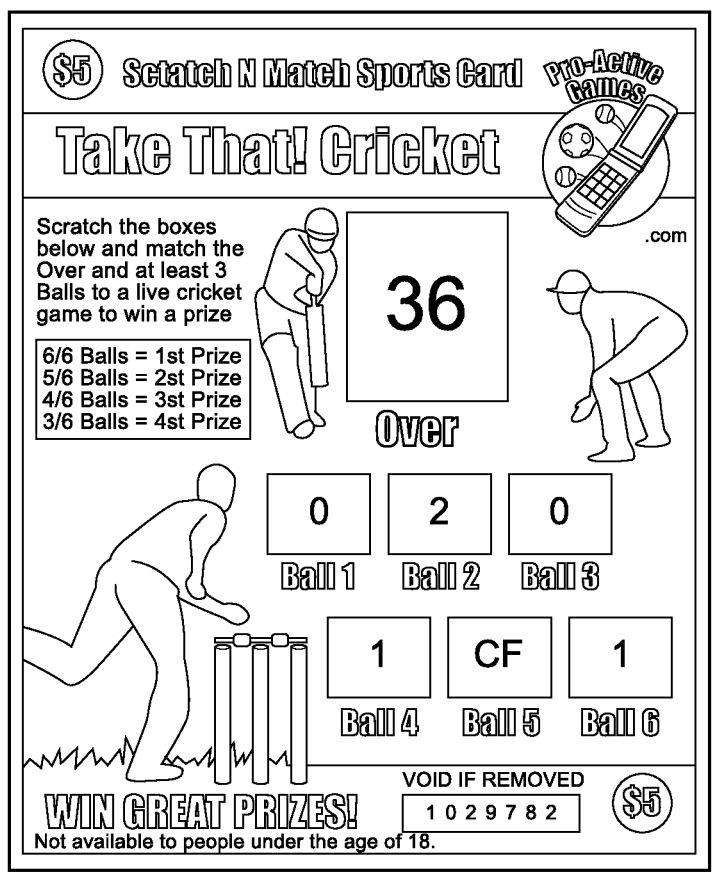
FIG. 4 depicts a scratch card according to the present invention, issued in relation to a cricket match, this scratch card having been scratched by the purchaser to reveal its specific data, as generated by the Random Number Generator (RNG) for the allocated Over.

FIG. 3 depicts a scratch card according to the present invention, issued in relation to a cricket match, this scratch card being in "as to be sold" condition (unscratched); and FIG. 4 depicts that scratch card after having been scratched by the purchaser to reveal its specific data, as generated by the Random Number Generator (RNG) for the allocated Over.

Example 2

"Scratch 'n' Match Sports Cards" for Baseball

A Random Number Generator (RNG) based or housed on a secure server, outside the control of the lottery organiser, generates a pre-determined quantity of games (e.g. 50,000) as requested by the Major League Baseball (MLB) organisation for the MLB game, New York Yankees versus Boston Red Sox, to be played at Yankee Stadium on the 1st of Apr. 2009.

Figure 6:
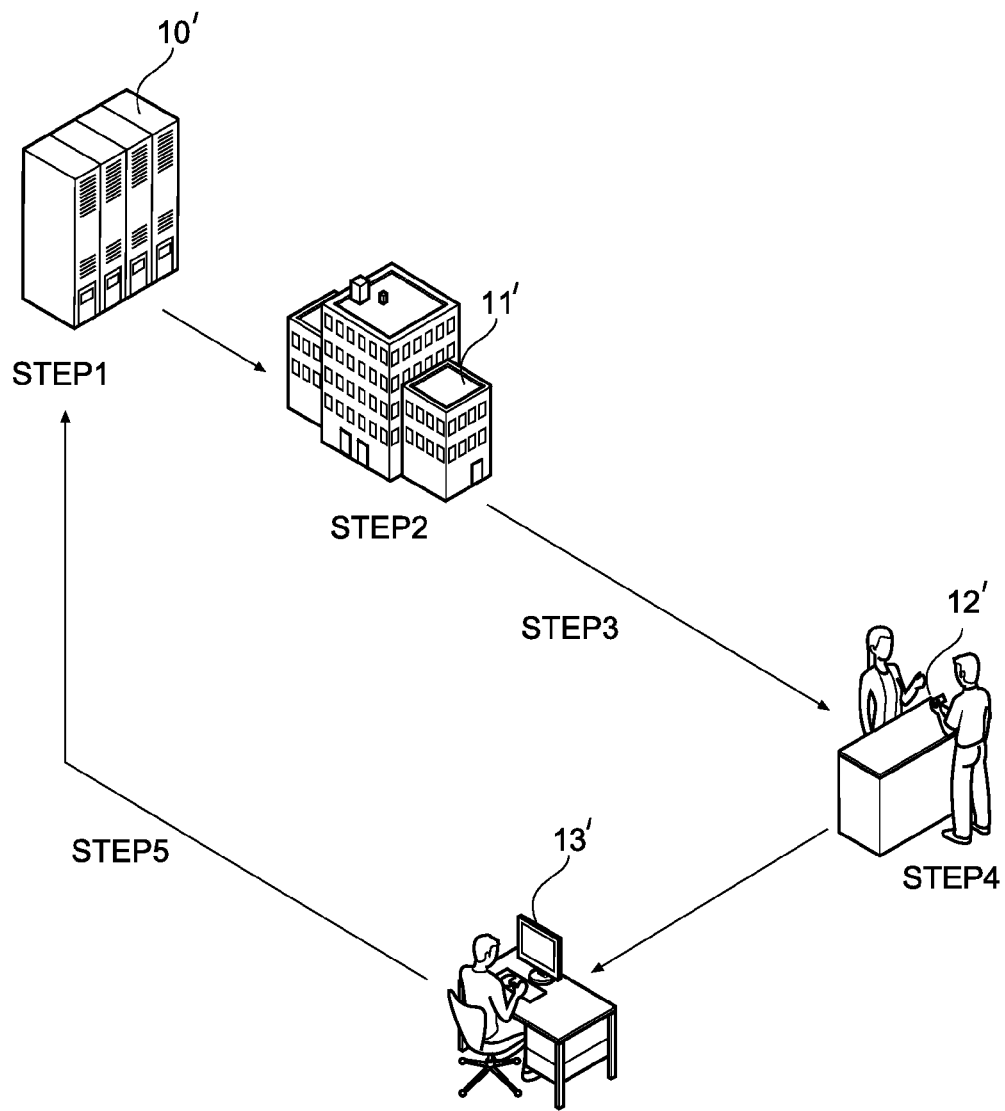
FIG. 6 is a block diagram illustrating the interaction of the various components of the system of the present invention, for scratch cards to be issued in relation to a baseball game—in this case, an MLB game, New York Yankees versus Boston Red Sox, that is to be played at Yankee Stadium on the 1st of Apr. 2009.

The process is illustrated in FIG. 6. Each game provides a randomly generated Innings allocation (including the top and bottom of an innings) having a randomly generated "six outs" scenario of characters and numbers (which may include strikeouts/fly outs caught by a specified defensive fielder/catcher and/or base runners tagged out on specified bases) in relation to the MLB game, New York Yankees versus Boston Red Sox. In Step 1, the operating system or server 10' of the organisers of the lottery houses a Random Number Generator (RNG) which generates the required number (e.g. 50,000) of games, each of the games corresponding to possible results for the baseball match. Each game has a corresponding pin code allocated to it. The pin code includes a serial number for verification purposes.

In Step 2, a database including the data generated by the RNG is sent to a printer 11' to print off the 50,000 "Scratch 'n' Match Sports Cards", conveniently a week prior to the date on which this MLB game commences. Each of the 50,000 "Scratch 'n' Match Sports Cards" will have a randomly generated Innings allocation (including the top and bottom of an innings) comprising a randomly generated "six outs" scenario of characters and numbers (which may include strikeouts/fly outs caught by a specified defensive fielder/catcher and/or base runners tagged out on specified bases) printed on the front of it. Furthermore, each "Scratch 'n' Match Sports Card" will have, on the front of it, a different serial number (but the same batch number) and a fixed price of (for example) $(USD)5. The printer prints off the required number (in this case, 50,000) of "Scratch 'n' Match Sports Cards" and, in Step 3, the lottery organiser arranges for the shipment of those cards to suitable sales venues, including the Yankee Stadium, prior to the start of the MLB game, New York Yankees versus Boston Red Sox. In Step 4, a "Scratch 'n' Match Sports Card" is purchased at one of these sales venues by a purchaser 12'.

Figure 5:
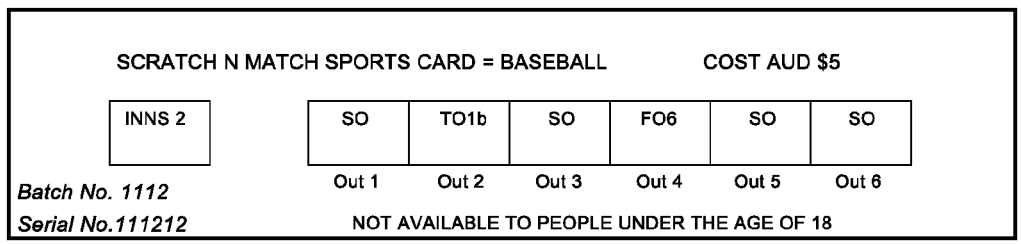
FIG. 5 illustrates the information to be incorporated on a scratch card according to the present invention, issued in relation to a game of baseball.

In the above example, a "Scratch 'n' Match Sports Card" purchaser 12', after having scratched off the scratchable material covering the squares of their scratch card, may have the results indicated in FIG. 5. (The scratchable material is often grey in colour, although other colours can be used.) The batch number for the batch of "Scratch 'n' Match Sports Cards" produced for that baseball game is 1112, the serial number (verification code) for this particular card is 111212, the randomly generated Innings allocation is Innings 2, and the randomly generated "six outs" scenario is:

Out 1—SO
Out 2—TO1b
Out 3—SO
Out 4—FO6
Out 5—SO
Out 6—SO

If the actual six outs in the top and bottom within Innings 2 of the MLB game, New York Yankees versus Boston Red Sox played at Yankee Stadium on the 1st of Apr. 2009, provide outcomes which "match" the corresponding "6 outs" outcome printed on the purchaser's "Scratch 'n' Match Sports Card", then the purchaser is said to have "6/6 Out Matching", and is directed to go to the lottery organiser's website and enter their personal details, the serial number and batch number for confirmation of a winning "Scratch 'n' Match Sports Card".

In baseball, six batters are out in an Innings, where the Innings represents the top and bottom of an innings (three batters being out in the top of the innings and three batters being out in the bottom of the innings) So, in total, there is a maximum of 9 Innings per baseball game in relation to this invention. In each game, 14 (fourteen) different outcomes are possible for the way a batter is out in an Innings.

The 14 possible outcomes are:
Number and Character Values (Representing how Batters Got Out):
SO=Strikeout
FO1=Caught by Pitcher
FO2=Caught by Catcher
FO3=Caught by First Baseman
FO4=Caught by Second Baseman
FO5=Caught by Third Baseman
FO6=Caught by Short Stop
FO7=Caught by Left Field
FO8=Caught by Centre Field
FO9=Caught by Right Field
TO1b=Tagged Out on First Base
TO2b=Tagged Out on Second Base
TO3b=Tagged Out on Third Base
TO4b=Tagged Out on Home Plate
=14 outcomes.

In a preferred embodiment, no two "Scratch 'n' Match Sports Cards" generated for the same baseball game will be the same.

In an alternative embodiment, it is possible for the RNG to generate more than one "Scratch 'n' Match Sports Card" including the same data. In that case, if more than one "Scratch 'n' Match Sports Card" is eligible for a particular prize, the amount awarded to the holder of a winning card will be dependent on the total number of cards which are eligible for that prize.

Step 5 relates to claiming a prize. If, after the baseball match has been played, the purchaser 12' believes that he/she may have a winning ticket, the purchaser can (using his/her laptop computer 13' or any other convenient means) enter the required personal details (such as his/her name, address and phone number) and the serial number and batch number of the ticket on the website of the lottery organisers. The ticket details can be entered manually or using a scanner. The mainframe computer system of the lottery organisers will cross-reference the details entered by the purchaser with the data stored on the computer to confirm whether the ticket is authentic. The purchaser may then be required to present his/her ticket to the lottery organisers (or one of their agents) for further verification and to be awarded an appropriate prize.

Alternatively, rather than the purchaser checking his/her ticket to ascertain whether it is a winning ticket, the ticket can be taken to the lottery organisers (or one of their agents) for this check to be carried out and for an appropriate prize (if any) to then be awarded.

FIG. 6 is a block diagram illustrating the interaction of the various components of the system, and providing further information in relation to this Example.

Figure 7:
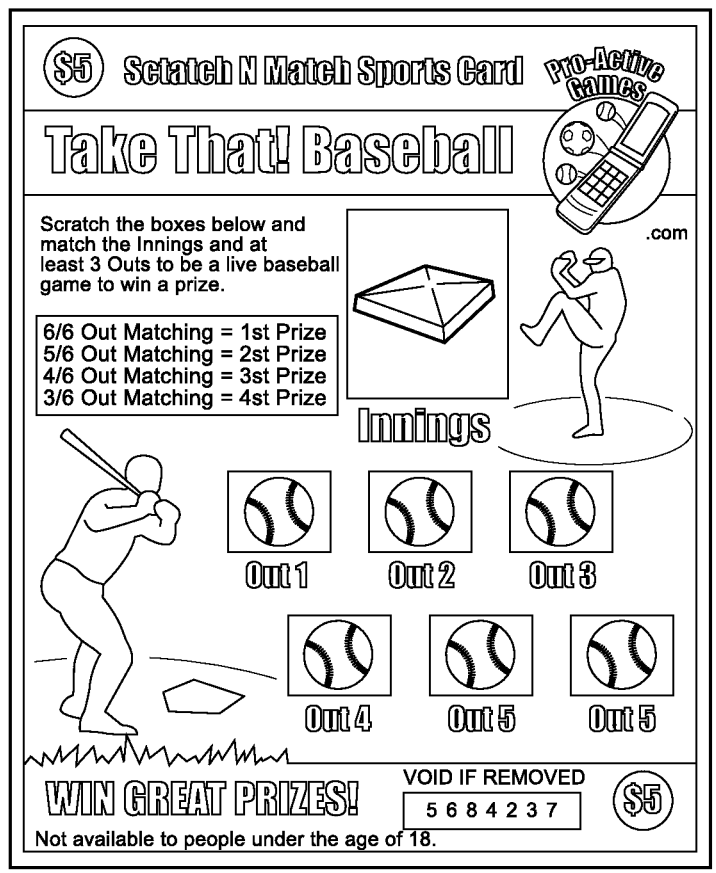
FIG. 7 depicts a scratch card according to the present invention, issued in relation to a baseball game, this scratch card being in "as to be sold" condition (unscratched)
Figure 8:
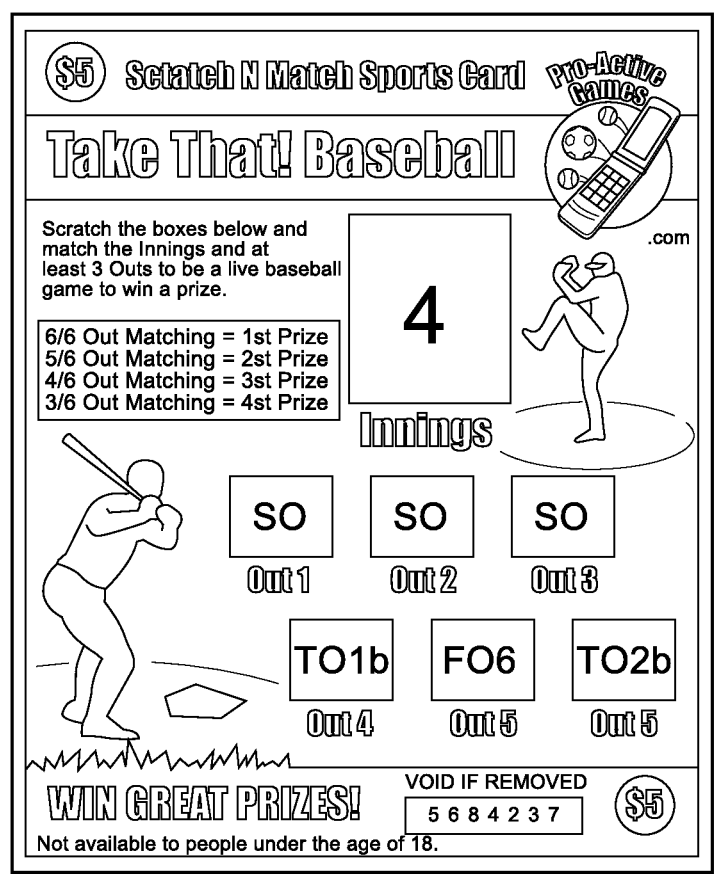
FIG. 8 depicts a scratch card according to the present invention, issued in relation to a baseball game, this scratch card having been scratched by the purchaser to reveal its specific data, as generated by the Random Number Generator (RNG) for the allocated Innings.

FIG. 7 depicts a scratch card according to the present invention, issued in relation to a baseball game, this scratch card being in "as to be sold" condition (unscratched); and FIG. 8 depicts that scratch card after having been scratched by the purchaser to reveal its specific data, as generated by the Random Number Generator (RNG) for the allocated Innings.

The popularity of sports has grown immensely over the years and, even though there are many gambling or gaming systems available for various sports and many forms of scratch tickets, the inventor is unaware of any similar concept to that of the present invention, where random data generating software is used to randomly generate the various scenarios for different sports, with those scenarios being printed onto lottery tickets, such as "Scratch 'n' Match Sports Cards". The present invention allows people who enjoy buying instant scratch tickets a novel way of interacting with a "live" sports event or sporting contest. This invention differs from TAB-style sports betting systems in that it allows people the opportunity to interact with a "live" sports event or sporting contest (e.g. a cricket match or baseball game) even if their knowledge of that particular sport is limited.

In order to facilitate better understanding of the invention, the present invention has been described in terms of preferred embodiments, and with regard to the particular elements and/or features described or depicted therein. It should however be appreciated that various modifications can be made without departing from the principles of the invention. Therefore, the invention should be understood to include all such modifications within its scope.

For example, even though the lottery system of the present invention has been outlined above in regard to people purchasing lottery tickets or cards at a sporting venue or lottery agency, the invention can easily be applied to people playing on-line or by SMS via their mobile phone. The same principles apply. The only difference is that, in order to play on-line or via SMS, the purchaser will normally be required to register their personal details and set up an account on the lottery organiser's mainframe computer (administration) system and have funds available in that account in order to purchase a lottery ticket or card. Therefore, the second input unit of the lottery management module will require input of the purchaser's contact information, preferably including a postal address for forwarding of any prizes won.

Furthermore, even though the lottery system of the present invention has been specifically described above in regard to the sports cricket and baseball, this invention is by no means limited to those sports and can be applied to many other sports, for example World Football (soccer), rugby, rugby league, Australian Rules football or tennis.

Although the lottery system of the present invention has been described with specific reference to scratch cards, it also extends to other forms of lotteries. For example, the purchaser can purchase a ticket or card which is printed or produced upon purchase (e.g. at a lottery agency or on-line) with the randomly generated data corresponding to results of gameplay, a sports event or a sporting contest, and also a verification code. The same principles are applicable whether or not the details of the lottery ticket or card are immediately apparent to the purchaser upon purchase, or whether they are initially concealed (e.g. as a scratch card).

The invention claimed is:

1. A lottery system including:
    input means for receiving possible outcomes of game play in a game or an identifiable portion of a game, wherein at least one of the possible outcomes occurs in the game or portion thereof and the number of possible outcomes of the game is a parameter chosen to control the desired odds of winning the lottery;
    a computer processor for processing of parameters and outcomes for game play;
    random data generating software which generates:
        multiple sets of random outcome data, corresponding to possible outcomes of game play, and
        a verification code for each set of random outcome data;
    a database for storage of the multiple sets of random outcome data and verification codes;
    a lottery ticket generator for generating lottery tickets, each of which incorporates at least one set of random outcome data generated by the software together with the verification code for each set of data;
    a lottery transaction processing module which communicates with the computer processor, wherein the lottery transaction processing module allows the purchase of lottery ticket(s); and
    a lottery management system which communicates with the computer processor, wherein the lottery management system includes:
        a first input means for input of an actual outcome of game play, a sports event or a sporting contest, and
        a second input means which allows input of the random outcome data and verification code from a lottery ticket;
    wherein the random outcome data and verification code from the lottery ticket are communicated to the computer processor for comparison and verification with the random outcome data stored under that verification code in the database and, if the verification code from the lottery ticket is confirmed as being authentic, an appropriate prize is determined, based on a comparison between the set(s) of random outcome data appearing on the lottery ticket and the actual outcome of the game play, sports event or sporting contest.

2. A lottery ticket using the system of claim 1.

3. A lottery ticket using the system of claim 1, wherein the ticket is an electronic scratch ticket.

4. A lottery ticket using the system of claim 1, wherein the ticket includes a combination of non-numerical and/or numerical outcomes of game play.

5. The system of claim 1, wherein the system further comprises a module to select a subset of lottery tickets generated using random generating software, such that all of the lottery tickets in the subset have a unique set of random outcome data that is not repeated in the subset.

6. The system of claim 1, wherein the input means is adapted to receive a request for an identifiable portion of the game.

7. The system of claim 1, wherein the game is one which has already occurred and been completed.

8. The system of claim 1, wherein the game is yet to be completed and the random outcome data from the lottery ticket is compared with the actual outcome of game play, the sports event or the sporting contest as the game occurs or after the game has been completed.

* * * * *